United States Patent [19]

Abe et al.

[11] Patent Number: 4,953,229

[45] Date of Patent: Aug. 28, 1990

[54] IMAGE PROCESSING APPARATUS

[75] Inventors: Yoshinori Abe; Masahiko Matsunawa, both of Hachioji, Japan

[73] Assignee: Konishiroku Photo Industry Co., Ltd., Tokyo, Japan

[21] Appl. No.: 430,096

[22] Filed: Oct. 31, 1989

Related U.S. Application Data

[63] Continuation of Ser. No. 353,142, May 15, 1989, abandoned, which is a continuation of Ser. No. 136,431, Dec. 17, 1987, abandoned, which is a continuation of Ser. No. 21,613, Mar. 2, 1987, abandoned, which is a continuation of Ser. No. 700,448, Feb. 11, 1985, abandoned.

[51] Int. Cl.$^5$ .................................................. G06K 9/36
[52] U.S. Cl. ........................................ 382/41; 382/44; 382/45
[58] Field of Search ................. 340/744, 747; 358/136, 358/137, 140, 448–453; 364/518, 520, 200, 900; 382/1, 41, 44, 45

[56] References Cited

U.S. PATENT DOCUMENTS

| | | | |
|---|---|---|---|
| 4,007,362 | 2/1977 | Sindermann | 364/518 |
| 4,197,583 | 4/1980 | Westell et al. | 358/280 |
| 4,439,790 | 3/1984 | Yoshida | 358/256 |
| 4,451,895 | 5/1984 | Sliwkowski | 340/707 |
| 4,454,593 | 1/1984 | Fleming et al. | 364/521 |
| 4,475,161 | 10/1984 | Stock | 364/521 |
| 4,587,633 | 5/1986 | Wang et al. | 364/900 |
| 4,727,589 | 2/1988 | Hirose et al. | 382/1 |

OTHER PUBLICATIONS

Robert Davies, "Refresh Graphics Peripheral Configures to the Host System", *Electronic Design*, vol. 29, No. 17, 8-6-80, pp. 123–127.

Davis Bursky, "Japanese Microcomputers Step Up in Graphics", *Electronic Design*, vol. 29, No. 14, 7-9-81, pp. 43–46.

*Primary Examiner*—David K. Moore
*Assistant Examiner*—Jose L. Couso
*Attorney, Agent, or Firm*—Jordan B. Bierman

[57] ABSTRACT

An image processing apparatus has an image memory storing a image data input by a image reader, a data interface means converting the picture element density of the image data transferred from the image memory through a transfer control circuit, a frame memory storing the converted image data, a display controller controlling the converted image data as to display on a display, and an operating means producing a layout command for the displayed image data, wherein the display controller processes the converted image data stored in the frame memory in accordance with the layout command and changes the displayed image data. The apparatus further comprises a image processing circuit processing the image data stored in the image memory on the basis of layout information corresponding to the displayed image data on the display and then can output the fine image for printing purposes 15 Claims, 3 Drawing Sheets

IMAGE PROCESSING APPARATUS

This application is a continuation of application 07/353,140 filed May 15, 1989, abandoned which is a continuation of applicator 07/136,431, filed Dec. 17, 1987, abandoned, which is continuation of application 07/021,613 filed March 2, 1987, abandoned, which is a continuation of application 06/700,448, filed Feb. 11, 1985, abandoned.

BACKGROUND OF THE INVENTION

Field of the Invention

The present invention relates to an image processing apparatus which is improved in workability of image layout on its display.

Description of the Prior Art

Up to this time, it has been attempted to realize an apparatus with which, displaying the image information inputted as electric signals onto its display and observing this display, an operator lays out the image. Such an image layout apparatus, for example, may be able to read a plural number of documents by its image reader such as a CCD, to store them as image data of electric signals for a time, then to produce these document images simultaneously on its display with use of these image data, to shift the positions of document images (so-called layout) by operation of a pointing device such as a tablet or mouse, and thereby to form the desired final image on its display, and, in addition, to print the final image thereafter as required.

On using such a type as the above image processing apparatus, a certain difference in resolution may occasionally exist between the document information inputted as electric signals (for example, 16 dots/mm in case that documents are read by a CCD and outputted as electric signals), and the display (for example, 4 dots/mm). In such cases, such means as to decrease the number of dots or to convert the picture element density may be applied under the usual necessity of matching the resolution of image to by laid out to the resolution of display. However in case of printing the laid-out image thereafter, some troubles may occur. For example, decreasing the number of dots may cause a coarse printed image of at best 4 dots/mm or so. And converting the picture element density may cause heavy lines to become notched and fine lines to become blurred, resulting in some image deterioration, because the picture element density, which has been once reduced by processing, is returned back again by processing the image data. In addition, the problem may occur that, when the image is necessary to debug after finishing layout, the image data must be again inputted, because both the layout processing and the image data processing are carried out simultaneously. Furthermore, when layout is accomplished with such a type as the above image processing apparatus, the image apparatus is moved by its operator who is then observing the image information produced on the display. In this case, however, positioning of display becomes wrong or slightly deviate, and so, especially, fine shifting of layout becomes difficult, because the image produced on the display is usually smaller than a given size (for example, A4). For this reason, it may be occasionally necessary that a trial display is once printed on a piece of paper of the given size in order that whether the layout has been correctly produced as desired, and then the display is modified if undesirable. Such a layout work is very awkward and inefficient for operators in publishing firms or the like who compile layout, looking to a plural number of documents. Especially, when the size of image to be laid out is smaller than the displaying size, the problem occurs that the necessity of laying out in consideration of printing procedure makes the layout work burdensome, because of difficulty of positioning of each document.

OBJECTS AND SUMMARY OF THE INVENTION

The present invention has been made in consideration of the above-mentioned problems. The primary object of the present invention is to provide an image processing apparatus which can produce even image information of high resolutions without any image deterioration and has an improved layout workability. To attain this object, the image processing apparatus of the present invention is constructed so that the image data operational processing to display the image data, and the image data operational processing based on image information after laying out may be made independently from each other through their respective processing circuits. In addition, the image processing apparatus of the present invention can be also constructed so that the layout index patterns, including a frame pattern which indicates the size of layout and a lattice pattern for positioning of the layout, are displayed together on the display for the image information.

DESCRIPTION OF THE PREFERRED EMBODIMENTS

Figure 1:
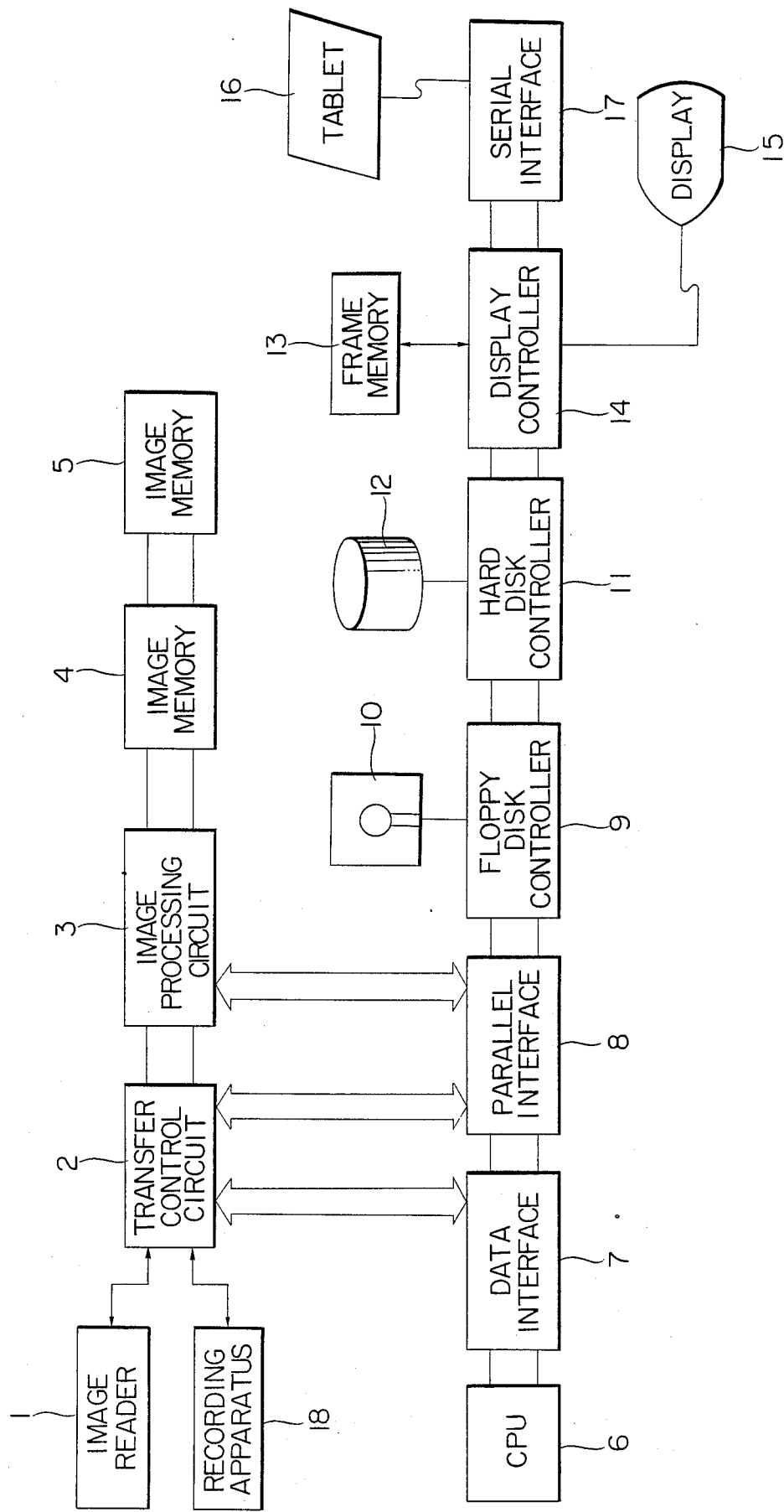
FIG. 1 is a block diagram which shows the construction of image processing apparatus of the present invention.

Referring now to the drawings, a description on the present invention is provided.

FIG. 1 outlines the construction of an example of image processing apparatus of the present invention.

In FIG. 1, 1 is the image reader, such as a CCD, which reads inputted documents and outputs read image data; 2 is the transfer control circuit which controls transfer of the image data among image reader 1 and image memories 4 and 5 or frame memory 13 mentioned later respectively; 3 is the image processing circuit which performs the prescribed operations using the image data stored in image memories 4 and 5; image memory 4 stores the image data which are outputted by image reader 1 for a time; image memory 5 stores the image data which are made by image processing circuit 3; 6 is the CPU which controls circuit operations of the whole circuit; 7 is the data interface which makes the resolutions of image data from image memories 4 and 5 match each other, and transfers the said image data to later-mentioned frame memory 13; 8 is the parallel interface which outputs commands from CPU 6 into transfer control circuit 2 and image processing circuit 3; 9 is the floppy disk controller which controls floppy disk as an external storage; 11 is the hard disk controller which controls hard disk as another external storage; frame memory 13 stores the frame image data for displaying; 14 is the display controller which controls the operation of frame memory 13 and the expression of display 15; display 15 indicates both the said image data and the commands for layout that are inputted from later-mentioned tablet 16; 16 is the tablet which outputs commands for cursor shifting and for layout; 17 is the serial interface which inputs the data from tablet 16 into display controller 14; and 18 is the recording apparatus, such as a laser printer or LED printer, which records the contents of image memories 4 and 5.

Then a description on circuit operations by the image processing apparatus which has the above-mentioned construction is given as follows.

Documents are read by image reader 1, and image data are stored through transfer control circuit 2 in image memories 4 or 5, which have comparatively higher density. Image data stored in image memories 4 and 5 are converted to the image data for a display which have relatively lower density into their picture element densities by data interface 7, and the converted image data for a display are transferred to frame memory 13. Image data stored in frame memory 13 are controlled by display controller 14, and displayed by display 15. The layout is made on display 15 with tablet 16, and then recorded by recording apparatus 18.

The foregoing are the basic circuit operations of image processing apparatus of the present invention to lay out image. Next, referring to FIG. 2, a description on the only circuit operations directly relevant to the present invention.

Figure 2:
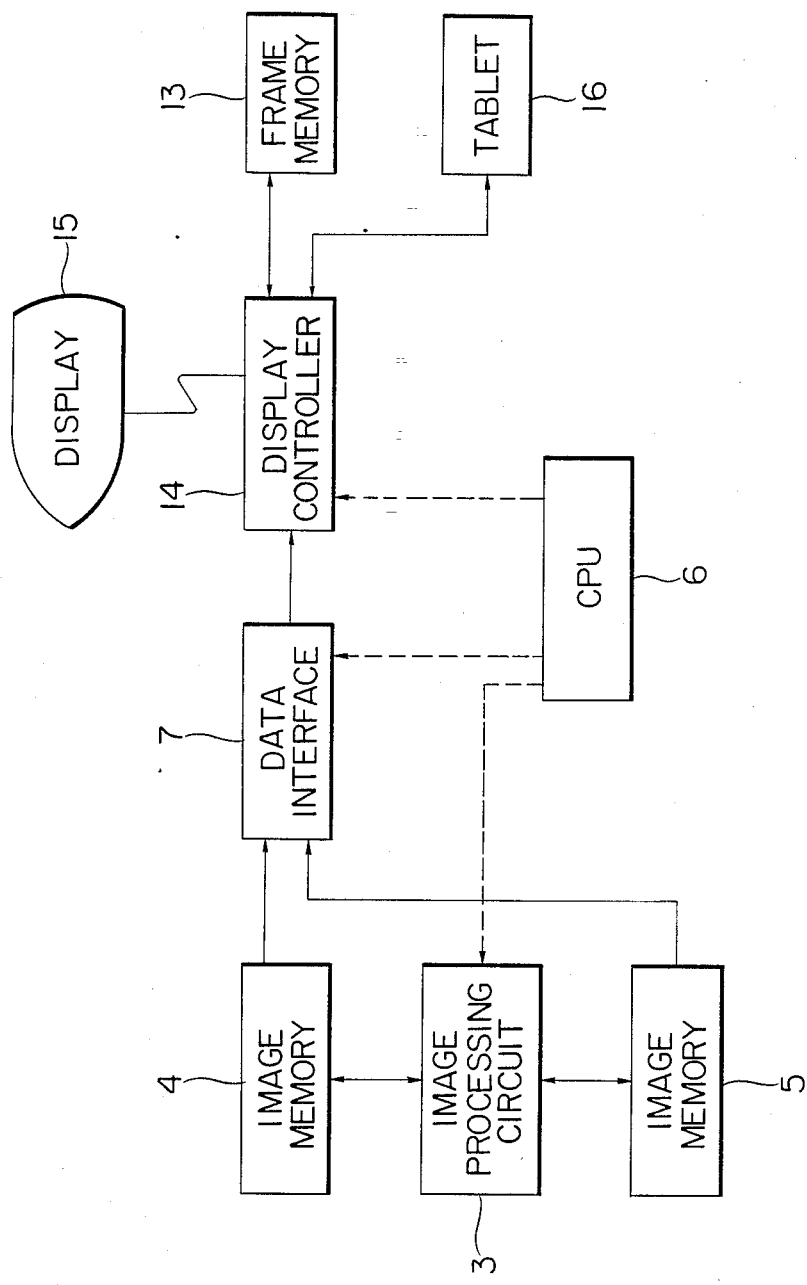
FIG. 2 is a block diagram of principal parts of the said image processing apparatus presented in FIG. 1.

FIG. 2 shows a principal extract from FIG. 1; reference numbers such as 3 to 7 and 13 to 16 in FIG. 2 represent the same components as in FIG. 1, respectively.

Display controller 14 (having a function of a first processing part) once transfers the image data stored in image memories 4 and 5 to frame memory 13, and then the image is displayed on display 15 in accordance with the image data of frame memory 13. The layout is made up with input of layout commands from tablet 16 by the operator who is then observing the image displayed on display 15.

CPU 6, which controls addresses of laid-out images, converts addresses of images that have already been laid out into corresponding addresses of image memories 4 and 5, and gives commands to image processing circuit 3. Image processing circuit 3 (having a function of a second processing part) receives the commands from CPU 6, and operates in accordance with the layout using the image data already stored in image memories 4 and 5. In this case, the picture element densities of image data, which are outputted by image reader 1 and stored in image memories 4 and 5, are not similar to those of the image data for display stored in frame memory 13, but comparatively higher (for example, 16 dots/mm for CCD) than those. Therefore, recording of image thereafter based on the image data which have been made up by the said operational processing does not cause the problem of image deterioration, which could occur in case of conventional reconversion of picture element densities.

In the above example, display controller 14, which operates the display on display 15, and image processing circuit 3, which operates between image memories 4 and 5, are separately provided. It is also possible however that both display controller 14 and image processing circuit 3 with image memories 4 and 5 are provided on the same bus to interate both in common.

Furthermore in the above example, a second reading of documents is unnecessary when the image is necessary to debug after finishing layout, resulting in improvement of workability, because the image data obtained by reading of documents are stored in floppy disk 10 by floppy disk controller 9, or in hard disk 12 by hard disk controller 11, together with addresses after laying out.

As described above, the image processing apparatus of the present invention is constructed so that the image data operational processing for producing display and the image data operational processing based on laid-out image information may be made independently from each other through their respective processing circuits. Therefore, since the problem of image deterioration, which could occur in case that, when the inputted image information and the outputted are different in resolution, the picture element densities are once converted, and, after laying out, reconverted to reproduce the original resolution, never occurs in the image processing apparatus of the present invention, even image information with high resolution can be recorded as layout images of good quality. In addition, exclusion of a second reading of documents when debugging image after laying out causes workability to improve.

Figure 3:
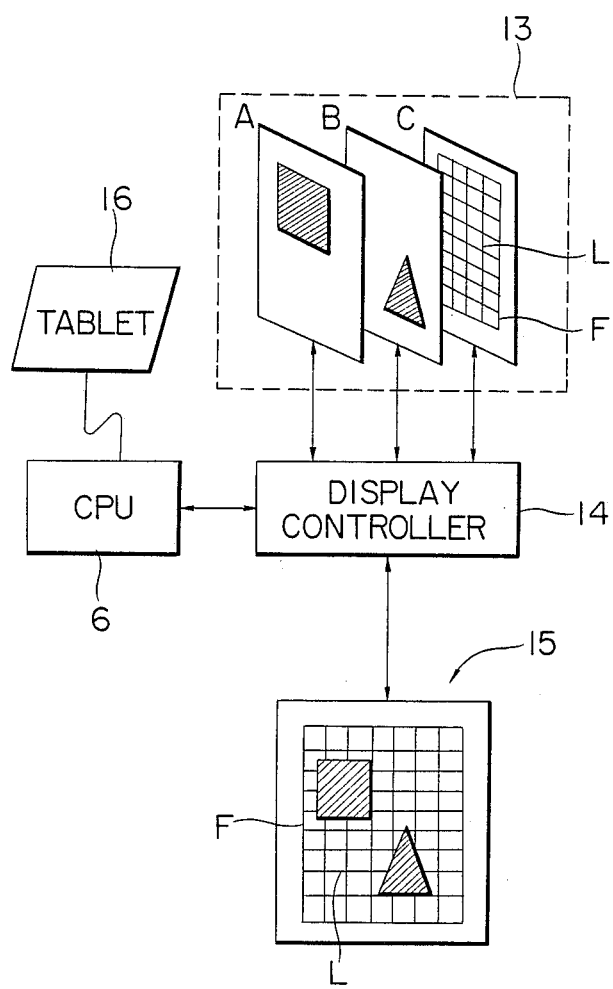
FIG. 3 is a block diagram of the only further principal parts of the said image processing apparatus presented in FIG. 1 in case that index patterns are added to the frame memory of the said image processing apparatus.

FIG. 3 shows the only further principal extract from FIG. 1 in case that index patterns are added to the frame memory; reference numbers such 6 and 13 to 16 in FIG. 3 represent the same components as in FIG. 1, respectively.

Frame memory 13 is divided into a plural number of layers (3 layers in FIG. 3, called A, B and C respectively). The image data, which are outputted from image reader 1 (in FIG. 1) and stored in image memories 4 and 5, are submitted to conversion of resolution (that is, conversion of picture element density), and stored in layer A or B of frame memory 13. In FIG. 3, for example, normal image data are stored on layer A as a square image, and on layer B as a triangular image.

Figure 4:
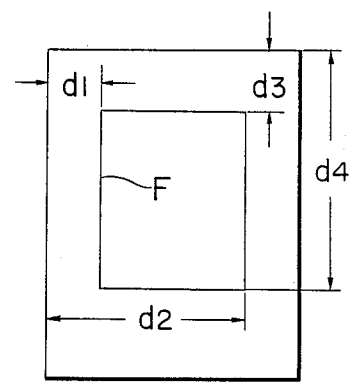
FIG. 4 is a drawing which presents an example of the original index patterns that are stored in the said frame memory.

On the other hand, index data which indicate layout index patterns, such as frame pattern F and lattice pattern L, that represent the size of layout, have been preliminarily stored on layer C of frame memory 13. These index patterns may be made so that index patterns to be original index patterns may be preliminarily stored in frame memory 13, and be displayed on display 15 with the desired size in accordance with the size of recording paper and the recording position depending on data inputted from tablet 16 when laying out. As shown in FIG. 4, for example, the shape of frame as an original index pattern may be once stored in layer C of frame memory 13, and then the size and position on display 15 are operated and displayed with CPU 6 based on size data $d_1$, $d_2$, $d_3$ and $d_4$ which are inputted from tablet 16. Alternatively, it may be possible that index patterns are preliminarily made according to relatively common sizes (such as A4 and B5), and stored in a ROM.

At the time of laying out, the square image and the triangular image are displayed on display 15 based on the image data stored on layers A and B of frame memory 13, while the layout index pattern stored on layer C is displayed with the desired size and position. The resulting display will be as shown in FIG. 3. At the time of laying out, if the image information is shifted on the basis of this frame F of the index pattern, positioning is correctly accomplished even though image information displayed is somewhat smaller than the prescribed size; fine shifting of image becomes possible by being based on the lattice pattern F, resulting in the desired layout with ease. In addition, if the size of recording paper is selected according to the size of frame of the index pattern, workability is still more improved.

In the above example, the size and position of index pattern displayed for layout can be changed according to data inputted by the operator at the time of laying out. The size and position of index pattern may be automatically selected depending on the size of recording paper that is detected. In the present invention, layout index patterns are not limited to the above-mentioned square or rectangular patterns, but available also as round and triangular patterns or so. In addition, direct inputting from a ten-key, instead of a pointing device, is also applicable.

As described above, in an image processing apparatus with which, displaying the image information that is inputted in the form of electric signals onto the display and observing this display, one lays out the image, the layout can be made up more finely and more correctly, resulting in much more improved workability, if the layout index patterns can be laid out at the desired position on the display in the desired size.

What is claimed is:

1. An apparatus for processing an image comprising an image reader for reading an original image and outputting first image data based thereon to an image memory for storing said first image data,
   a data interface comprising means for converting said first image data into second image data by reducing the number of pixels of said first image data,
   a frame memory for storing said second image data,
   a first processing part comprising a display and an operating means, said first processing part processing said second image data to display said second image data from said frame memory on said display,
   said operating means providing a layout command for assigning a new location to at least some elements of said image so that second image data can be relocated to said new location and
   a second processing part for processing said first image data stored in said image memory so that said first image data is displayed in said new location, assigned to said second image data, in accordance with said layout command.

2. The apparatus of claim 1 further comprising a second frame memory which stores index data corresponding to location index patterns on said display.

3. The image processing apparatus as set forth in claim 2, wherein said location index patterns are either a frame pattern or lattice patterns or both.

4. The image processing apparatus as set forth in claim 2, wherein the size of recording paper is automatically selected according to the size of frame of the said location index patterns.

5. The apparatus of claim 1, further comprising recording means for recording said first image data corresponding to an output from said second processing part.

6. The apparatus of claim 1 wherein said operating means comprises a pointing device.

7. The apparatus of claim 2 wherein said first processing part displays said location index patterns stored in said second frame memory means.

8. The apparatus of claim 2 wherein said size of the index pattern corresponds to the size of recording paper.

9. The apparatus of claim 2 further comprising means for controlling the size of said index patterns.

10. The apparatus of claim 2 further comprising means for displaying said index patterns on said display.

11. An apparatus for processing an image comprising
    generating means for generating first image data and second image data of an original document image, said second image data being generated by reducing the number of pixels of said first image data,
    image memory means for storing said first image data,
    frame memory means for storing said second image data,
    a first processing means for controlling said second image data stored in said frame memory, said first processing means comprising means for assigning a new location to at least some elements of said image so that said second image data can be displayed in said new location, and means for displaying said new location of said second image data,
    and means for processing said first image data whereby said first image data is relocated to said new location as assigned with said second image data.

12. The apparatus of claim 11 further comprising a second frame memory which stores index data corresponding to location index patterns on said display.

13. The apparatus of claim 12, further comprising means for displaying location index patterns stored in second frame memory means on said display.

14. The apparatus of claim 13, wherein said first processing means displays said location index patterns.

15. The apparatus of claim 12 further comprising means for displaying said index patterns on said display.

* * * * *